(12) United States Patent
Matsunaga et al.

(10) Patent No.: US 11,725,258 B2
(45) Date of Patent: Aug. 15, 2023

(54) COPPER ALLOY FOR ELECTRONIC/ELECTRICAL DEVICES, COPPER ALLOY PLANAR BAR STOCK FOR ELECTRONIC/ELECTRICAL DEVICES, COMPONENT FOR ELECTRONIC/ELECTRICAL DEVICES, TERMINAL AND BUS BAR

(71) Applicant: MITSUBISHI MATERIALS CORPORATION, Tokyo (JP)

(72) Inventors: Hirotaka Matsunaga, Aizuwakamatsu (JP); Yuki Ito, Ageo (JP); Hiroyuki Mori, Tsukuba (JP); Hiroyuki Matsukawa, Iwaki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 17/762,630

(22) PCT Filed: Sep. 11, 2020

(86) PCT No.: PCT/JP2020/034423
§ 371 (c)(1),
(2) Date: Mar. 22, 2022

(87) PCT Pub. No.: WO2021/060013
PCT Pub. Date: Apr. 1, 2021

(65) Prior Publication Data
US 2022/0341000 A1    Oct. 27, 2022

(30) Foreign Application Priority Data

Sep. 27, 2019  (JP) .................................. 2019-177145

(51) Int. Cl.
*C22C 9/00* (2006.01)
*B32B 15/01* (2006.01)
(Continued)

(52) U.S. Cl.
CPC .............. *C22C 9/00* (2013.01); *B32B 15/018* (2013.01); *B32B 15/20* (2013.01); *C22F 1/08* (2013.01)

(58) Field of Classification Search
None
See application file for complete search history.

(56) References Cited

U.S. PATENT DOCUMENTS

| | | |
|---|---|---|
| 2014/0087606 A1 | 3/2014 | Maki et al. |
| 2016/0138135 A1 | 5/2016 | Maki et al. |
| 2016/0369374 A1 | 12/2016 | Maki et al. |

FOREIGN PATENT DOCUMENTS

| | | |
|---|---|---|
| CN | 102851526 A | 1/2013 |
| CN | 105189793 A | 12/2015 |

(Continued)

OTHER PUBLICATIONS

Machine translation from Espacenet of JP 2017-143233 A, translated Mar. 22, 2023 (Year: 2017).*

(Continued)

*Primary Examiner* — Elizabeth Collister
(74) *Attorney, Agent, or Firm* — Leason Ellis LLP; Melvin C. Garner; Mitsuhiro Haraguchi

(57) ABSTRACT

This copper alloy for electronic or electric devices contains 100 mass ppm or greater and 400 mass ppm or less of Mg, 5 mass ppm or greater and 20 mass ppm or less of Ag, and less than 5 mass ppm of P with a balance being Cu and inevitable impurities, in which when a ratio of J3, in which all three grain boundaries constituting a grain boundary triple junction are special grain boundaries, to all grain boundary triple junctions is defined as $NF_{J3}$ and a ratio of J2, in which two grain boundaries constituting a grain boundary triple junction are special grain boundaries and one grain boundary constituting the grain boundary triple junction is a (Continued)

random grain boundary, to all grain boundary triple junctions is defined as $NF_{J2}$, an expression of $0.22<(NF_{J2}/(1-NF_{J3}))^{0.5} \leq 0.45$ is satisfied.

9 Claims, 1 Drawing Sheet

(51) Int. Cl.
  *B32B 15/20*  (2006.01)
  *C22F 1/08*  (2006.01)

(56) References Cited

FOREIGN PATENT DOCUMENTS

| CN | 107208189 A | 9/2017 |
|---|---|---|
| JP | 2014111805 A | 6/2014 |
| JP | 2016056414 A | 4/2016 |
| JP | 2016060951 A | 4/2016 |
| JP | 2017143233 A | 8/2017 |
| JP | 2017179493 A | 10/2017 |
| JP | 2019178397 A | 10/2019 |
| WO | 2017170733 A1 | 10/2017 |

OTHER PUBLICATIONS

Chinese Notice of Allowance dated May 18, 2022 for the corresponding Chinese Patent Application No. 202080061069.9 (8 pages including English translation).

Kronberg et al., "Secondary Recrystallization in Copper", Metals Transactions, Aug. 1949, pp. 501-514, vol. 185.

D. G. Brandon, "The Structure of High-Angle Grain Boundaries", Acta Metallurgica, Nov. 14, 1966, pp. 1479-1484, vol. 14.

International Search Report dated Nov. 2, 2020 for the corresponding International Patent Application No. PCT/JP2020/034423, 4 pages [English translation attached].

* cited by examiner

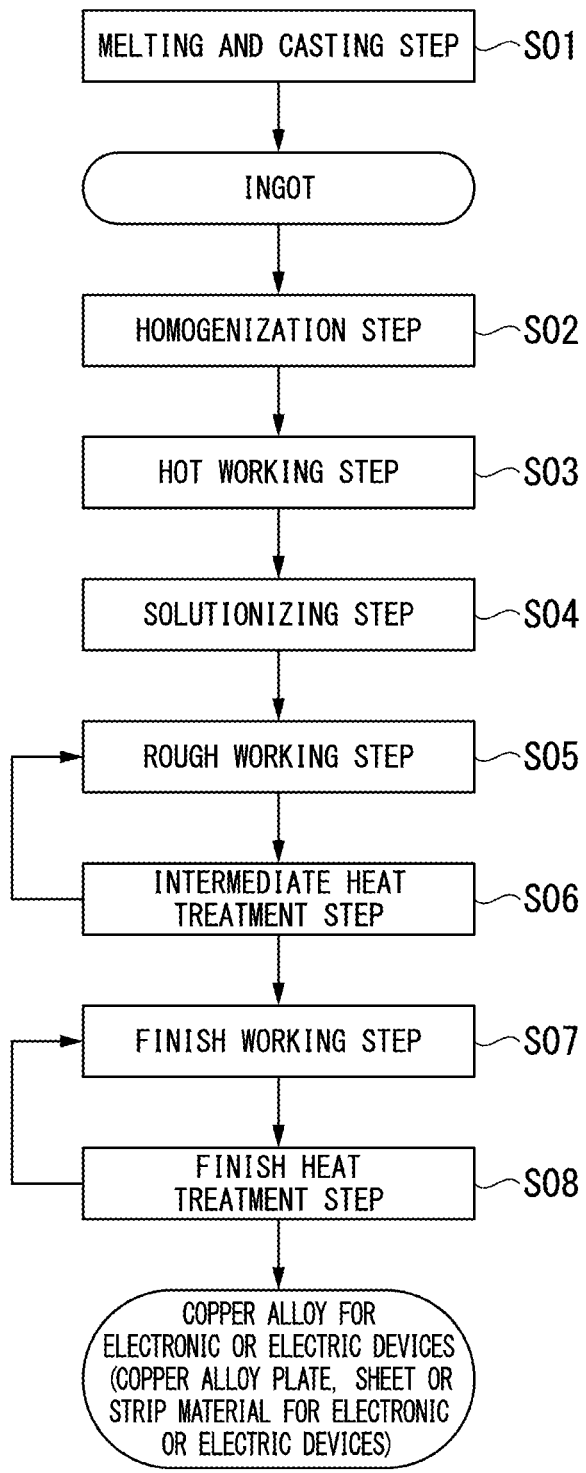

COPPER ALLOY FOR ELECTRONIC/ELECTRICAL DEVICES, COPPER ALLOY PLANAR BAR STOCK FOR ELECTRONIC/ELECTRICAL DEVICES, COMPONENT FOR ELECTRONIC/ELECTRICAL DEVICES, TERMINAL AND BUS BAR

CROSS-REFERENCE TO RELATED PATENT APPLICATIONS

This application is a U.S. National Phase application under 35 U.S.C. § 371 of International Patent Application No. PCT/JP2020/034423 filed on Sep. 11, 2020 and claims the benefit of priority to Japanese Patent Applications No. 2019-177145 filed on Sep. 27, 2019, the contents of all of which are incorporated herein by reference in their entireties. The International Application was published in Japanese on Apr. 1, 2021 as International Publication No. WO/2021/060013 under PCT Article 21(2).

FIELD OF THE INVENTION

The present invention relates to a copper alloy for electronic or electric devices suitable for a component for electronic or electric devices, for example, a terminal such as a connector or a press fit, or a bus bar, and a copper alloy plate, sheet or strip material for electronic or electric devices, a component for electronic or electric devices, a terminal, and a bus bar which are formed of the copper alloy for electronic or electric devices.

BACKGROUND OF THE INVENTION

In the related art, as a component for electronic or electric devices, for example, a terminal such as a connector or a press fit, or a bus bar, copper or a copper alloy with excellent electrical conductivity has been used.

With an increase in current of electronic devices and electric devices, in order to reduce the current density and diffuse heat due to Joule heat generation, an increase in size and an increase in thickness of a component for electronic or electric devices used for such electronic devices and electric devices have been attempted. Therefore, materials constituting a component for electronic or electric devices are required to have high electrical conductivity, bending workability, and punching workability during press working. Further, a terminal such as a connector used in a high-temperature environment such as an engine room of a vehicle is required to have stress relaxation resistance.

A Cu—Mg-based alloy is suggested in Japanese Unexamined Patent Application, First Publication No. 2016-056414 as the material used for a component for electronic or electric devices, for example, a terminal such as a connector or a press fit, or a bus bar.

In the Cu—Mg-based alloy described in Japanese Unexamined Patent Application, First Publication No. 2016-056414, since the stress relaxation resistance is improved by adding a solute element, the electrical conductivity thereof is inferior to that of pure copper. Therefore, development of a material with high stress relaxation resistance which has higher electrical conductivity and is capable of dealing with heat generation due to an increase in current has been desired. Further, punching properties were not described.

PRIOR ART DOCUMENTS

Patent Document

Patent Document 1: Japanese Unexamined Patent Application, First Publication No. 2016-056414

Problems to be Solved by the Invention

The present invention has been made in consideration of the above-described circumstances, and an object thereof is to provide a copper alloy for electronic or electric devices, a copper alloy plate, sheet or strip material for electronic or electric devices, and a component for electronic or electric devices, a terminal, and a bus bar which are formed of the copper alloy plate, sheet or strip material for electronic or electric devices, with excellent electrical conductivity, strength, stress relaxation resistance, bending workability, and punching workability.

SUMMARY OF THE INVENTION

Solutions for Solving the Problems

As a result of intensive research conducted by the present inventors in order to solve the above-described problem, it was found that the electrical conductivity, the strength, the stress relaxation resistance, and the bending workability can be improved by setting the amount of Mg and the amount of Ag contained in the alloy to be in a predetermined range and limiting the amount of P.

Further, as a result of analyzing a matrix according to the EBSD method using the surface orthogonal to the rolling width direction as an observation surface in the above-described copper alloy, it was found that fractures during press working are likely to develop along grain boundaries by defining the ratio of special grain boundaries and random grain boundaries constituting grain boundary triple junctions, and thus the punching workability during press working can be improved.

In order to solve the above-described problem, there is provided a copper alloy for electronic or electric devices according to an aspect of the present invention, including: 100 mass ppm or greater and 400 mass ppm or less of Mg; 5 mass ppm or greater and 20 mass ppm or less of Ag; and less than 5 mass ppm of P, with a balance being Cu and inevitable impurities, in which a surface orthogonal to a rolling width direction is used as an observation surface, measurement regarding a matrix is performed on a measurement area of 10000 $\mu m^2$ or greater at every measurement intervals of 0.25 $\mu m$ by an EBSD method, measured results are analyzed by data analysis software OIM to obtain a CI value in each measurement point, a measurement point in which a CI value is 0.1 or less is removed, an orientation difference between crystal grains is analyzed, a boundary having 15° or more of an orientation difference between neighboring measuring points is assigned as a grain boundary, an average grain size A is acquired according to Area Fraction, measurement regarding the matrix is performed at every measurement intervals which are ⅒ or less of the average grain size A by the EBSD method, measured results are analyzed by the data analysis software OIM with a measurement area of 10000 $\mu m^2$ or greater in a plurality of visual fields such that a total of 1000 or more crystal grains are included to obtain a CI value in each measurement point, a measurement point in which a CI value is 0.1 or less is removed, an orientation difference between crystal grains is analyzed, and a boundary having 15° or more of an orientation difference between neighboring measuring points is assigned as a grain boundary, a coincidence boundary with Σ29 or less is defined as a special grain boundary, and the other grain boundaries are defined as random grain boundaries, in grain boundary triple junctions analyzed by the OIM, when a ratio of J3, in which all three grain boundaries constituting a grain boundary triple junction are special grain boundaries, to all grain boundary triple junctions is defined as $NF_{J3}$ and a ratio of J2, in which two grain boundaries constituting a grain boundary triple junction are special grain boundaries and one grain boundary constituting the grain boundary triple junction is a random grain boundary, to all grain boundary triple junctions is defined as $NF_{J2}$, an expression of $0.22<(NF_{J2}/(1-NF_{J3}))^{0.5} \leq 0.45$ is satisfied.

Further, the EBSD method denotes an electron backscatter diffraction patterns (EBSD) method using a scanning electron microscope provided with a backscattered electron diffraction image system, and the OIM denotes data analysis software (orientation imaging microscopy: OIM) for analyzing crystal orientation using data measured by EBSD. Further, the CI value denotes a confidence index (confidence index), which is a numerical value displayed as a numerical value showing the reliability of crystal orientation determination when analyzed using analysis software OIM Analysis (Ver. 7.3.1) of an EBSD device (for example, "EBSD Reader: Using OIM (Revised 3rd Edition)" written by Seiichi Suzuki, September 2009, published by TSL Solutions Inc.).

When the structure of the measurement point measured by the EBSD method and analyzed by OIM is a deformed structure, the crystal pattern is not clear; and therefore, the reliability of crystal orientation determination is lowered, and the CI value is lowered. In particular, in a case where the CI value is 0.1 or less, it is determined that the structure of the measurement point is a deformed structure.

Further, the special grain boundary is defined as a coincidence boundary in which a Σ value satisfies a relationship of $3 \leq \Sigma \leq 29$, and the Σ value is crystallographically defined based on CSL theory (Kronberg et al: Trans. Met. Soc. AIME, 185, 501 (1949)), and the coincidence boundary is a grain boundary in which the intrinsic corresponding site lattice orientation defect Dq satisfies a relationship of $Dq \leq 15°/\Sigma^{1/2}$ (D. G. Brandon: Acta. Metallurgica. Vol. 14, p. 1479, (1966)).

In addition, the random grain boundary is a grain boundary other than the special grain boundary having a coincidence orientation relationship in which a Σ value is 29 or less and satisfies $Dq \leq 15°/\Sigma^{1/2}$. That is, the special grain boundary has a coincidence orientation relationship in which a Σ value is 29 or less and satisfies $Dq \leq 15°/\Sigma^{1/2}$, and the grain boundary other than the special grain boundary is the random grain boundary.

Further, as the grain boundary triple junctions, four kinds of grain boundary triple junctions, J0 where all three grain boundaries are random grain boundaries, J1 where one grain boundary is a special grain boundary and two grain boundaries are random grain boundaries, J2 where two grain boundaries are special grain boundaries and one grain boundary is a random grain boundary, and J3 where all three grain boundaries are special grain boundaries, are present.

Therefore, the ratio $NF_{J3}$ of J3, where all three grain boundaries constituting a grain boundary triple junction are special grain boundaries, to all grain boundary triple junctions (the ratio of the number of J3 to the number of all grain boundary triple junctions) is defined by $NF_{J3} = \Sigma J3/(\Sigma J0 + \Sigma J1 + \Sigma J2 + \Sigma J3)$ when the total number of J0 is represented by ΣJ0, the total number of J1 is represented by ΣJ1, the total number of J2 is represented by ΣJ2, and the total number of J3 is represented by ΣJ3.

Further, the ratio $NF_{J2}$ of J2, where two grain boundaries constituting a grain boundary triple junction are special grain boundaries and one grain boundary constituting the grain boundary triple junction is a random grain boundary, to all grain boundary triple junctions (the ratio of the number of J2 to the number of all grain boundary triple junctions) is defined by $NF_{J2} = \Sigma J2/(\Sigma J0 + \Sigma J1 + \Sigma J2 + \Sigma J3)$.

According to the copper alloy for electronic or electric devices having the above-described configurations, since the amount of Mg is in a range of 100 mass ppm or greater and 400 mass ppm or less and the amount of Ag is in a range of 5 mass ppm or greater and 20 mass ppm or less, the strength and the stress relaxation resistance can be improved without significantly decreasing the electrical conductivity.

Further, since the amount of P is less than 5 mass ppm, the bending workability can be ensured.

Further, a surface orthogonal to a rolling width direction is used as an observation surface, measurement regarding a matrix is performed on a measurement area of 10000 µm² or greater at every measurement intervals of 0.25 µm by an EBSD method. The measured results are analyzed by data analysis software OIM to obtain a CI value in each measurement point. The measurement point in which a CI value is 0.1 or less is removed. The orientation difference between crystal grains is analyzed by the data analysis software OIM, and a boundary having 15° or more of an orientation difference between neighboring measuring points is assigned as a grain boundary. The average grain size A is obtained by Area Fraction. The measurement regarding the matrix is performed at every measurement intervals which are 1/10 or less of the average grain size A by the EBSD method. The measured results are analyzed by the data analysis software OIM with a total measurement area of 10000 µm² or greater in a plurality of visual fields such that a total of 1000 or more crystal grains are included to obtain a CI value in each measurement point. The measurement point in which a CI value is 0.1 or less is removed. The orientation difference between crystal grains is analyzed by the data analysis software OIM, and a boundary having 15° or more of an orientation difference between neighboring measuring points is assigned as a grain boundary. The coincidence boundary with Σ29 or less is defined as a special grain boundary, and the other grain boundaries are defined as random grain boundaries. In grain boundary triple junctions analyzed by the OIM, the ratio of J3, where all three grain boundaries constituting a grain boundary triple junction are special grain boundaries, to all grain boundary triple junctions is defined as $NF_{J3}$ and the ratio of J2, where two grain boundaries constituting a grain boundary triple junction are special grain boundaries and one grain boundary constituting the grain boundary triple junction is a random grain boundary, to all grain boundary triple junctions is defined as $NF_{J2}$.

Since the copper alloy for electronic or electric devices according to one aspect of the present invention satisfies Expression of $0.22<(NF_{J2}/(1-NF_{J3}))^{0.5} \leq 0.45$, fractures are likely to develop along the grain boundaries, and thus the punching workability during press working can be improved.

In the copper alloy for electronic or electric devices according to one aspect of the present invention, it is preferable that an electrical conductivity is 90% IACS or greater.

In this case, since the electrical conductivity is sufficiently high, the copper alloy can be used for applications in which pure copper has been used in the related art.

In the copper alloy for electronic or electric devices according to one aspect of the present invention, it is preferable that a 0.2% yield strength measured by a tensile test performed in a direction parallel to a rolling direction is in a range of 150 MPa or greater and 450 MPa or less.

In this case, since the 0.2% yield strength measured by a tensile test performed in a direction parallel to the rolling direction is in a range of 150 MPa or greater and 450 MPa or less, the copper alloy is easily handled without forming a winding habit even in a case of being wound into a coil shape when a plate, sheet or strip material has a thickness of greater than 0.5 mm, and thus high productivity can be achieved. Therefore, the copper alloy is particularly suitable as a copper alloy of a component for electronic or electric devices, for example, a terminal such as a connector or a press fit, or a bus bar for high-voltage and high-current applications.

Further, in the copper alloy for electronic or electric devices according to one aspect of the present invention, it is preferable that the residual stress ratio is 50% or greater under conditions of 150° C. for 1000 hours.

In this case, since the residual stress ratio is specified as described above, permanent deformation can be suppressed to be small in a case of being used in a high-temperature environment, and a decrease in contact pressure of a connector terminal or the like can be suppressed. Therefore, the copper alloy can be applied as a material of a component for an electronic device to be used in a high-temperature environment such as an engine room.

The copper alloy plate, sheet or strip material for electronic or electric devices according to one aspect of the present invention includes the above-described copper alloy for electronic or electric devices and a thickness is greater than 0.5 mm.

According to the copper alloy plate, sheet or strip material for electronic or electric devices having these configurations, since the copper alloy plate, sheet or strip material is formed of the copper alloy for electronic or electric devices, the electrical conductivity, the strength, the stress relaxation resistance, and the punching workability are excellent, and thus the copper alloy plate, sheet or strip material is particularly suitable as a material of a component for electronic or electric devices, for example, a terminal such as a thickened connector or press fit, or a bus bar.

It is preferable that the copper alloy plate, sheet or strip material for electronic or electric devices according to one aspect of the present invention includes an Sn plating layer or an Ag plating layer on a surface thereof.

In this case, since the copper alloy plate, sheet or strip material includes an Sn plating layer or an Ag plating layer on the surface thereof, the copper alloy plate, sheet or strip material is particularly suitable as a material of a component for electronic or electric devices, for example, a terminal such as a connector or a press fit, or a bus bar. Further, according to one aspect of the present invention, the concept of "Sn plating" includes pure Sn plating or Sn alloy plating and the concept of "Ag plating" includes pure Ag plating or Ag alloy plating.

The component for electronic or electric devices according to one aspect of the present invention includes the above-described copper alloy plate, sheet or strip material for electronic or electric devices. Further, examples of the component for electronic or electric devices according to one aspect of the present invention includes a terminal such as a connector or a press fit, and a bus bar.

Since the component for electronic or electric devices having these configurations is produced using the copper alloy plate, sheet or strip material for electronic or electric devices described above, excellent characteristics can be exhibited even in a case of an increase in size and thickness in response to high-current applications.

The terminal according to one aspect of the present invention includes the above-described copper alloy plate, sheet or strip material for electronic or electric devices.

Since the terminal with such a configuration is produced using the copper alloy plate, sheet or strip material for electronic or electric devices described above, excellent characteristics can be exhibited even in a case of an increase in size and thickness in response to high-current applications.

The bus bar according to one aspect of the present invention includes the above-described copper alloy plate, sheet or strip material for electronic or electric devices.

Since the bus bar with such a configuration is produced using the copper alloy plate, sheet or strip material for electronic or electric devices described above, excellent characteristics can be exhibited even in a case of an increase in size and thickness in response to high-current applications.

Effects of Invention

According to one aspect of the present invention, it is possible to provide a copper alloy for electronic or electric devices, a copper alloy plate, sheet or strip material for electronic or electric devices, and a component for electronic or electric devices, a terminal, and a bus bar which are formed of the copper alloy plate, sheet or strip material for electronic or electric devices, with excellent electrical conductivity, strength, stress relaxation resistance, bending workability, and punching workability.

BRIEF DESCRIPTION OF THE DRAWING(S)

The FIGURE is a flow chart showing a method of producing a copper alloy for electronic or electric devices according to the present embodiment.

DETAILED DISCLOSURE OF THE INVENTION

Hereinafter, a copper alloy for electronic or electric devices according to an embodiment of the present invention will be described.

The copper alloy for electronic or electric devices according to the present embodiment has a composition including 100 mass ppm or greater and 400 mass ppm or less of Mg, 5 mass ppm or greater and 20 mass ppm or less of Ag, and less than 5 mass ppm of P, with a balance being Cu and inevitable impurities. That is, the copper alloy for electronic or electric devices contains the above-described amounts of Mg, Ag, and P with a balance being Cu and inevitable impurities.

In the copper alloy for electronic or electric devices according to the embodiment of the present invention, a surface orthogonal to a rolling width direction is used as an observation surface, measurement regarding a matrix is performed on a measurement area of 10000 $\mu m^2$ or greater at every measurement intervals of 0.25 $\mu m$ by an EBSD method. The measured results are analyzed by data analysis software OIM to obtain a CI value in each measurement point. The measurement point in which a CI value is 0.1 or less is removed. The orientation difference between crystal grains is analyzed by the data analysis software OIM, and a boundary having 15° or more of an orientation difference between neighboring measuring points is assigned as a grain boundary. The average grain size A is acquired by Area Fraction using the data analysis software OIM. Measurement regarding the matrix is performed at every measurement intervals which are 1/10 or less of the average grain size A by the EBSD method. The measured results are analyzed by the data analysis software OIM with a total measurement area of 10000 μm² or greater in a plurality of visual fields such that a total of 1000 or more crystal grains are included to obtain a CI value in each measurement point. The measurement point in which a CI value is 0.1 or less is removed. The orientation difference between crystal grains is analyzed by the data analysis software OIM, and a boundary having 15° or more of an orientation difference between neighboring measuring points is assigned as a grain boundary. The coincidence boundary with Σ29 or less is defined as a special grain boundary, and the other grain boundaries are defined as random grain boundaries. In grain boundary triple junctions analyzed by the OIM, when the ratio of J3, where all three grain boundaries constituting a grain boundary triple junction are special grain boundaries, to all grain boundary triple junctions is defined as $NF_{J3}$ and the ratio of J2, where two grain boundaries constituting a grain boundary triple junction are special grain boundaries and one grain boundary constituting the grain boundary triple junction is a random grain boundary, to all grain boundary triple junctions is defined as $NF_{J2}$, an expression of $0.22 < (NF_{J2}/(1-NF_{J3}))^{0.5} \leq 0.45$ is satisfied.

As described above, the matrix is measured twice by the EBSD method. In the first measurement, the average grain size A is obtained. The measurement interval in the second measurement is determined by the obtained average grain size A.

Further, in the copper alloy for electronic or electric devices according to the present embodiment, the electrical conductivity is preferably 90% IACS or greater.

Further, in the copper alloy for electronic or electric devices according to the present embodiment, the 0.2% yield strength measured by a tensile test performed in a direction parallel to a rolling direction is preferably in a range of 150 MPa or greater and 450 MPa or less. In other words, in the present embodiment, a rolled material of the copper alloy for electronic or electric devices is used, and the 0.2% yield strength measured by the tensile test performed in a direction parallel to the rolling direction in the final step of rolling is specified as described above.

Further, in the copper alloy for electronic or electric devices according to the present embodiment, the residual stress ratio is preferably 50% or greater under conditions of 150° C. for 1000 hours.

The reasons for specifying the component composition, the crystal structure, and various characteristics as described above will be described.

(Mg: 100 mass ppm or greater and 400 mass ppm or less)

Mg is an element having an effect of improving the heat resistance and the stress relaxation resistance without decreasing the electrical conductivity by being dissolved into the matrix of copper. Further, excellent bending workability is obtained by dissolving Mg into the matrix.

In a case where the amount of Mg is less than 100 mass ppm, there is a concern that the effect may not be sufficiently exhibited. On the contrary, in a case where the amount of Mg is greater than 400 mass ppm, the electrical conductivity is decreased.

As described above, in the present embodiment, the amount of Mg is set to be in a range of 100 mass ppm or greater and 400 mass ppm or less.

In order to further improve the strength and the stress relaxation resistance, the lower limit of the amount of Mg is set to preferably 110 mass ppm or greater, more preferably 120 mass ppm or greater, still more preferably 150 mass ppm or greater, even still more preferably 200 mass ppm or greater, and even still more preferably 250 mass ppm or greater. Further, in order to reliably suppress a decrease in the electrical conductivity, the upper limit of the amount of Mg is set to preferably 380 mass ppm or less, more preferably 360 mass ppm or less, and still more preferably 350 mass ppm or less.

(Ag: 5 mass ppm or greater and 20 mass ppm or less)

Ag has a narrow solid solution limit at a low temperature and is unlikely to be dissolved into the Cu matrix. Therefore, in a case where Ag is dissolved into copper (the Cu matrix) at a high temperature, rapidly cooled, and subjected to warm working at 150° C. or higher and 350° C. or lower, a part of Ag that is dissolved into the matrix is segregated at grain boundaries and dislocations introduced by the working. As a result, diffusion of atoms at dislocations and grain boundaries is suppressed. Accordingly, the stress relaxation resistance is further improved by adding a small amount of Ag together with Mg.

In a case where the amount of Ag is less than 5 mass ppm, there is a concern that the effect may not be sufficiently exhibited. Further, in a case where the amount of Ag is greater than 20 mass ppm, further effects are not recognized, and the production cost is increased.

As described above, in the present embodiment, the amount of Ag is set to be in a range of 5 mass ppm or greater and 20 mass ppm or less.

In order to further improve the strength and the stress relaxation resistance, the lower limit of the amount of Ag is preferably 6 mass ppm or greater, more preferably 7 mass ppm or greater, and still more preferably 8 mass ppm or greater. Further, in order to further reduce the production cost, the upper limit of the amount of Ag is preferably 18 mass ppm or less, more preferably 16 mass ppm or less, and still more preferably 14 mass ppm or less.

(P: less than 5 mass ppm)

A small amount of P contained in copper has an effect of being segregated at a part of grain boundaries and promoting diffusion in the vicinity of the grain boundaries and degrades the stress relaxation resistance. Further, in a case where the amount of P is sufficiently increased, P that is dissolved into the matrix further reacts with Mg to generate a crystallized product during casting and reacts with some inevitable impurities to form a phosphide. Since such crystallized products and phosphides are the cause of fracture during bending working, cracks are likely to occur during cold working and bending working.

Therefore, in the present embodiment, the amount of P is limited to less than 5 mass ppm.

In order to further suppress the occurrence of cracks, the upper limit of the amount of P is set to preferably less than 3.0 mass ppm, more preferably less than 2.5 mass ppm, and still more preferably less than 2 mass ppm.

(Inevitable Impurities)

Examples of other inevitable impurities include B, Ca, Sr, Ba, Sc, Y, rare earth elements, Ti, Zr, Hf, V, Nb, Ta, Cr, Mo, W, Mn, Re, Fe, Ru, Os, Co, Se, Te, Rh, Ir, Ni, Pd, Pt, Au, Zn, Cd, Hg, Al, Ga, In, Ge, Sn, As, Sb, Tl, Pb, Bi, Be, N, C, Si, Li, H, O, and S. From the viewpoint that such inevitable impurities have an effect of decreasing the electrical conductivity, it is preferable that the amount of the inevitable impurities is small.

Further, from the viewpoint that the electrical conductivity is decreased due to Zn and Sn being easily mixed into copper, it is preferable that the total amount of Zn and Sn is set to less than 500 mass ppm.

Further, from the viewpoint that Si, Cr, Ti, Zr, Fe, and Co greatly decrease the electrical conductivity and the bending workability deteriorates due to the formation of inclusions, it is preferable that the total amount of such elements is set to less than 500 mass ppm.

(Ratio of Grain Boundary Triple Junctions)

The smaller the burr height during fracturing is, the more excellent the punching workability during press working is. As the thickness of the material that performs press working increases, the burr height tends to increase relatively.

In order to reduce the burr height during press working, fracture may quickly occur along the grain boundaries during press working. In a case where the network length of random grain boundaries increases, fractures along the grain boundaries are more likely to occur. In order to increase the network length of random grain boundaries, it is important to control the ratio of J3 where all three grain boundaries constituting a grain boundary triple junction are special grain boundaries represented by Σ29 or less or the ratio of J2 where two out of three grain boundaries constituting the grain boundary triple junction are special grain boundaries.

Therefore, in the present embodiment, a surface orthogonal to a rolling width direction is used as an observation surface, measurement regarding a matrix is performed on a measurement area of 10000 μm² or greater at every measurement intervals of 0.25 μm by an EBSD method. The measured results are analyzed by data analysis software OIM to obtain a CI value in each measurement point. The measurement point in which a CI value is 0.1 or less is removed. The orientation difference between crystal grains is analyzed by the data analysis software OIM, and a boundary having 15° or more of an orientation difference between neighboring measuring points is assigned as a grain boundary. The average grain size A is obtained by Area Fraction. The measurement regarding the matrix is performed at every measurement intervals which are 1/10 or less of the average grain size A by the EBSD method. The measured results are analyzed by the data analysis software OIM with a total measurement area of 10000 μm² or greater in a plurality of visual fields such that a total of 1000 or more crystal grains are included to obtain a CI value in each measurement point. The measurement point in which a CI value is 0.1 or less is removed. The orientation difference between crystal grains is analyzed by the data analysis software OIM, and a boundary having 15° or more of an orientation difference between neighboring measuring points is assigned as a grain boundary. The coincidence boundary with Σ29 or less is defined as a special grain boundary, and the other grain boundaries are defined as random grain boundaries. In grain boundary triple junctions analyzed by the OIM, when the ratio of J3, where all three grain boundaries constituting a grain boundary triple junction are special grain boundaries, to all grain boundary triple junctions is defined as $NF_{J3}$ and the ratio of J2, where two grain boundaries constituting a grain boundary triple junction are special grain boundaries and one grain boundary constituting the grain boundary triple junction is a random grain boundary, to all grain boundary triple junctions is defined as $NF_{J2}$, an expression of $0.22 < (NF_{J2}/(1-NF_{J3}))^{0.5} \leq 0.45$ is satisfied.

In a case where $(NF_{J2}/(1-NF_{J3}))^{0.5}$ is greater than 0.45, the network length of a random grain boundary is relatively short, and the network length of a special grain boundary is long, and thus the burr height during press working increases. Further, in a case where $(NF_{J2}/(1-NF_{J3}))^{0.5}$ is 0.22 or less, the structure may become a substantially deformed structure and the yield strength may exceed 500 MPa, and as a result, the winding habit of the coil is strongly formed when the thickness of the plate or sheet is increased, and the productivity is decreased. Therefore, in the present embodiment, the value of $(NF_{J2}/(1-NF_{J3}))^{0.5}$ is set to be greater than 0.22 and 0.45 or less.

Further, the lower limit of $(NF_{J2}/(1-NF_{J3}))^{0.5}$ is preferably 0.23 or greater, more preferably 0.24 or greater, and still more preferably 0.25 or greater. Further, the upper limit of $(NF_{J2}/(1-NF_{J3}))^{0.5}$ is preferably 0.40 or less and more preferably 0.35 or less.

In consideration of the grain boundary network, the number of J2 increases according to the number of J3 in order for the random grain boundaries of J0 and J1 to form special grain boundaries constituting J3 and the network. That is, $NF_{J2}$ increases as $NF_{J3}$ increases. Therefore, $NF_{J3}$ is preferably 0.007 or greater, more preferably 0.008 or greater, and still more preferably 0.010 or greater. Further, in order to suppress the burr height, $NF_{J3}$ is preferably 0.036 or less, more preferably 0.034 or less, and still more preferably 0.030 or less.

(Electrical Conductivity: 90% IACS or Greater)

In a case where the electrical conductivity is 90% IACS or greater, since heat generation during electrical conduction is suppressed, the copper alloy is particularly suitable for a component for an electronic device, for example, a terminal such as a connector, a relay, or a lead frame as a substitute for pure copper.

The electrical conductivity is preferably 92% IACS or greater, more preferably 93% IACS or greater, still more preferably 95% IACS or greater, and even still more preferably 97% IACS or greater.

The upper limit of the electrical conductivity is not particularly limited, but is usually 103% IACS or less.

(0.2% yield strength: 150 MPa or greater and 450 MPa or less)

In the copper alloy for electronic or electric devices according to the present embodiment, in a case where the 0.2% yield strength is set to 150 MPa or greater, the copper alloy is particularly suitable as a material of a component for electronic or electric devices, for example, a terminal such as a connector or a press fit, or a bus bar. Further, in the present embodiment, the 0.2% yield strength measured by the tensile test performed in a direction parallel to the rolling direction is set to 150 MPa or greater. In a case of producing a terminal such as a connector or a press fit, or a bus bar by pressing, a coil-wound plate, sheet or strip material is used to improve the productivity, but the winding habit of the coil is formed and thus the productivity is decreased in a case where the 0.2% yield strength is greater than 450 MPa. Therefore, the 0.2% yield strength is preferably 450 MPa or less.

The lower limit of the 0.2% yield strength described above is preferably 200 MPa or greater and more preferably 220 MPa or greater. The upper limit of the 0.2% yield strength described above is preferably 440 MPa or less and more preferably 430 MPa or less.

(Residual Stress Ratio: 50% or Greater)

In the copper alloy for electronic or electric devices according to the present embodiment, the residual stress ratio is set to 50% or greater under conditions of 150° C. for 1000 hours as described above.

In a case where the residual stress ratio under the above-described conditions is high, permanent deformation can be suppressed to be small in a case of being used in a high-temperature environment, and a decrease in contact pressure can be suppressed. Therefore, the copper rolled plate or sheet according to the present embodiment can be applied as a terminal to be used in a high-temperature environment such as the periphery of an engine room of a vehicle.

In addition, the residual stress ratio is set to preferably 60% or greater under conditions of 150° C. for 1000 hours, more preferably 70% or greater under conditions of 150° C. for 1000 hours, and still more preferably 73% or greater under conditions of 150° C. for 1000 hours.

Next, a method of producing the copper alloy for electronic or electric devices according to the present embodiment with such a configuration will be described with reference to the flow chart of FIG. 1.

(Melting and Casting Step S01)

First, the above-described elements are added to molten copper obtained by melting the copper raw material to adjust components; and thereby, a molten copper alloy is produced. Further, a single element, a base alloy, or the like can be used for addition of various elements. In addition, raw materials containing the above-described elements may be melted together with the copper raw material. Further, a recycled material or a scrap material of the alloy according to the present embodiment may be used. As the molten copper, so-called 4 NCu having a purity of 99.99 mass % or greater or so-called 5 NCu having a purity of 99.999 mass % or greater is preferably used. In the melting step, in order to suppress oxidation of Mg and Ag and to reduce the hydrogen concentration, it is preferable that atmosphere-controlled melting is performed using an inert gas atmosphere (for example, Ar gas) in which the vapor pressure of $H_2O$ is low and the holding time for the melting is set to the minimum.

Further, the molten copper alloy in which the components have been adjusted is injected into a mold to produce an ingot. In consideration of mass production, it is preferable to use a continuous casting method or a semi-continuous casting method.

The cooling rate of the molten metal is set to preferably 0.1° C./sec or greater and more preferably 0.5° C./sec or greater.

(Homogenization Step S02)

Next, a heat treatment is performed for homogenization of the obtained ingot. Mg and Ag may be segregated and concentrated inside the ingot during the solidification process.

Therefore, in order to eliminate or reduce the segregation of Mg and Ag, a heat treatment of heating the ingot to 300° C. or higher and 900° C. or lower is performed. In this manner, Mg and Ag are uniformly diffused in the ingot or Mg and Ag are dissolved into the matrix. In addition, it is preferable that the homogenization step S02 is performed in a non-oxidizing or reducing atmosphere.

(Hot Working Step S03)

The segregation of Mg and Ag is likely to occur at the grain boundaries, and thus it is difficult to control grain boundary triple junctions in the structure where Mg segregation and Ag segregation are present.

Therefore, in order to thoroughly homogenize the structure, hot working is performed after the above-described homogenization step S02. The total working rate of the hot working is preferably 50% or greater, more preferably 60% or greater, and still more preferably 70% or greater. Further, the working method in the hot working step S03 is not particularly limited, and examples of the method which can be employed include rolling, drawing, extruding, groove rolling, forging, and pressing. Further, it is preferable that the hot working temperature is set to be in a range of 400° C. or higher and 900° C. or lower.

(Solutionizing Step S04)

In order to thoroughly eliminate Mg segregation and Ag segregation at the grain boundaries, a solutionizing heat treatment is carried out after the hot working step S03 described above. It is preferable that a solutionizing step S04 is performed under conditions where a heating temperature is 500° C. or higher and 900° C. or lower and a holding time is 1 second or longer and 10 hours or shorter at the heating temperature. The solutionizing step S04 may also serve as the hot working step S03 described above. In that case, the end temperature of the hot working may be set to higher than 500° C.

(Rough Working Step S05)

In order to work in a predetermined shape, rough working is performed. In this rough working step S05, warm working at a temperature of 100° C. or higher and 350° C. or lower is performed at least once. By carrying out warm working at a temperature of 100° C. or higher and 350° C. or lower, the number of extremely small recrystallization regions can be increased during the working, and the total number of random grain boundaries can be increased while the structure is randomized during recrystallization in a subsequent intermediate heat treatment step S06. In a case where the warm working is performed once, the warm working is carried out in the final step of the rough working step S05.

Further, working heat generation may be used by increasing the working rate per working step in place of the warm working. In this case, for example, it is preferable that the rolling is performed at a working rate of 15% or greater, preferably 20% or greater, and more preferably 30% or greater per pass.

In a case where the total working rate is extremely high, since the copper alloy is unlikely to be produced due to work hardening, it is preferable that the total rolling rate in the rough working step S05 is set to 99% or less.

It is preferable that the warm working is performed two or more times. For example, in a case where the warm working is rolling, it is preferable that the rolling is performed at a working rate of 15% or greater, preferably 20% or greater, and more preferably 30% or greater per pass.

The temperature of the warm working may be set to preferably 150° C. or higher and 350° C. or lower and more preferably higher than 200° C. and 350° C. or lower.

(Intermediate Heat Treatment Step S06)

After the rough working step S05, a heat treatment is carried out for the purpose of obtaining a recrystallization structure for increasing the number ratio of random grain boundaries and for the purpose of softening for improving the workability. A method of the heat treatment is not particularly limited, and the heat treatment is performed in a non-oxidizing atmosphere or a reducing atmosphere preferably in a holding temperature range of 400° C. or higher and 900° C. or lower for a holding time of 10 seconds or longer and 10 hours or shorter. Further, the cooling method after the heating is not particularly limited, but it is preferable that a method in which the cooling rate is 200° C./min or greater, such as water quenching or the like is employed.

Further, the rough working step S05 and the intermediate heat treatment step S06 may be repeatedly performed.

(Finish Working Step S07)

In order to work the copper material after the intermediate heat treatment step S06 in a predetermined shape, finish working is performed. In this finish working step S07, warm working may be performed at least once at a temperature of 50° C. or higher and lower than 300° C. in order to improve the stress relaxation resistance. By carrying out the warm working at a temperature of 50° C. or higher and lower than 300° C., dislocations introduced during the working are rearranged, and thus the stress relaxation resistance is improved. In the finish working step S07, the working method and the working rate vary depending on the final shape, but rolling may be performed in a case of strips, plates or sheets. Further, as the steps other than the warm working carried out one or more times, typical cold working may be performed. The working heat generation may be used by increasing the working rate per working step in place of the warm working at a temperature of 50° C. or higher and lower than 300° C. In this case, for example, the working rate per pass may be set to 10% or greater in the rolling.

Further, the working rate is appropriately selected such that the shape of the copper material is close to the final shape, but the upper limit of the working rate is set to preferably 90% or less, more preferably 85% or less, and most preferably 80% or less in order to set the tensile strength to be in a range of 200 MPa to 500 MPa by work hardening in the finish working step S07.

(Finish Heat Treatment Step S08)

Next, in order to improve the stress relaxation resistance, to carry out low-temperature annealing and hardening, or to remove residual strain, a finish heat treatment is performed on the plastically-worked material obtained by the finish working step S07. It is preferable that the heat treatment temperature is set to be in a range of 100° C. or greater and 800° C. or lower. In the finish heat treatment step S08, it is necessary to set the heat treatment conditions (the temperature, the time, and the cooling rate) in order to suppress the number ratio of the special grain boundaries at the grain boundary triple junctions due to recrystallization.

For example, it is preferable that the holding time in a temperature range of 200° C. to 350° C. is set to 10 seconds or longer and 10 hours or shorter. It is preferable that the heat treatment is performed in a non-oxidizing atmosphere or a reducing atmosphere. A method of performing the heat treatment is not particularly limited, but it is preferable that the heat treatment is performed using a continuous annealing furnace at a high temperature for a short period of time from the viewpoint of the effect of reducing the production cost.

Further, the finish working step S07 and the finish heat treatment step S08 may be repeatedly performed.

In the above-described manner, a copper alloy for electronic or electric devices (copper alloy plate, sheet or strip material for electronic or electric devices) according to the present embodiment is produced. The upper limit of the thickness of the copper alloy plate, sheet or strip material for electronic or electric devices is not particularly limited, but in a case where the thickness thereof is greater than 5.0 mm when the copper alloy plate, sheet or strip material for electronic or electric devices is subjected to press working to form a connector, a terminal, or a bus bar, the load of the press machine is significantly increased, and the productivity per unit time is decreased, and this leads to an increase in cost. Therefore, in the present embodiment, it is preferable that the thickness of the copper alloy plate, sheet or strip material for electronic or electric devices is set to greater than 0.5 mm and 5.0 mm or less. Further, the lower limit of the thickness of the copper alloy plate, sheet or strip material for electronic or electric devices is set to preferably greater than 1.0 mm and more preferably greater than 2.0 mm.

The copper alloy plate, sheet or strip material for electronic or electric devices according to the present embodiment may be used as a component for electronic or electric devices as it is, but an Sn plating layer or an Ag plating layer having a film thickness of 0.1 to 100 µm may be formed on one or both surfaces of the plate or sheet.

A component for electronic or electric devices, for example, a terminal such as a connector or press fit, or a bus bar is formed by performing punching working or bending working using the copper alloy for electronic or electric devices (copper alloy plate, sheet or strip material for electronic or electric devices) according to the present embodiment as the material.

According to the copper alloy for electronic or electric devices of the present embodiment having the above-described configurations, since the amount of Mg is set to be in a range of 100 mass ppm or greater and 400 mass ppm or less and the amount of Ag is set to be in a range of 5 mass ppm or greater and 20 mass ppm or less, the strength and the stress relaxation resistance can be improved without significantly decreasing the electrical conductivity.

Further, since the amount of P is less than 5 mass ppm, the bending workability can be ensured.

Further, a surface orthogonal to a rolling width direction is used as an observation surface, measurement regarding a matrix is performed on a measurement area of 10000 µm$^2$ or greater at every measurement intervals of 0.25 µm by an EBSD method. The measured results are analyzed by data analysis software OIM to obtain a CI value in each measurement point. The measurement point in which a CI value is 0.1 or less is removed. The orientation difference between crystal grains is analyzed by the data analysis software OIM, and a boundary having 15° or more of an orientation difference between neighboring measuring points is assigned as a grain boundary. The average grain size A is obtained by Area Fraction. The measurement regarding the matrix is performed at every measurement intervals which are ¹/₁₀ or less of the average grain size A by the EBSD method. The measured results are analyzed by the data analysis software OIM with a total measurement area of 10000 µm$^2$ or greater in a plurality of visual fields such that a total of 1000 or more crystal grains are included to obtain a CI value in each measurement point. The measurement point in which a CI value is 0.1 or less is removed. The orientation difference between crystal grains is analyzed by the data analysis software OIM, and a boundary having 15° or more of an orientation difference between neighboring measuring points is assigned as a grain boundary. The coincidence boundary with Σ29 or less is defined as a special grain boundary, and the other grain boundaries are defined as random grain boundaries. In grain boundary triple junctions analyzed by the OIM, when the ratio of J3, where all three grain boundaries constituting a grain boundary triple junction are special grain boundaries, to all grain boundary triple junctions is defined as $NF_{J3}$ and the ratio of J2, where two grain boundaries constituting a grain boundary triple junction are special grain boundaries and one grain boundary constituting the grain boundary triple junction is a random grain boundary, to all grain boundary triple junctions is defined as $NF_{J2}$, an expression of $0.22 < (NF_{J2}/(1-NF_{J3}))^{0.5} \leq 0.45$ is satisfied. Therefore, since the length of the random grain boundary network is long, and fracture quickly occurs along the grain boundaries during press working, press punching workability is also excellent.

Further, in the copper alloy for electronic or electric devices according to the present embodiment, the 0.2% yield strength measured by the tensile test performed in the direction parallel to the rolling direction is set to be in a range of 150 MPa or greater and 450 MPa or less, and the electrical conductivity is set to 90% IACS or greater. Therefore, the copper alloy is suitable as a component for electronic or electric devices which has been thickened for high-voltage and high-current applications and is particularly suitable as a material of a component for electronic or electric devices, for example, a terminal such as a connector or a press fit, or a bus bar.

Further, in the copper alloy for electronic or electric devices according to the present embodiment, the residual stress ratio is set to 50% or greater under conditions of 150° C. for 1000 hours. In a case where the copper alloy is used in a high-temperature environment, permanent deformation can be suppressed to be small, and a decrease in contact pressure of a connector terminal or the like can be suppressed. Therefore, the copper alloy can be applied as a material of a component for an electronic device to be used in a high-temperature environment such as an engine room.

Since the copper alloy plate, sheet or strip material for electronic or electric devices according to the present embodiment is formed of the copper alloy for electronic or electric devices described above, a component for electronic or electric devices, for example, a terminal such as a connector or a press fit, or a bus bar can be produced using this copper alloy plate, sheet or strip material for electronic or electric devices.

Further, in a case where an Sn plating layer or an Ag plating layer is formed on the surface of the copper alloy plate, sheet or strip material, the copper alloy plate, sheet or strip material is particularly suitable as the material of the component for electronic or electric devices, for example, a terminal such as a connector or a press fit, or a bus bar.

Further, since the component for electronic or electric devices (for example, a terminal such as a connector or a press fit, or a bus bar) according to the present embodiment is formed of the copper alloy for electronic or electric devices described above, excellent characteristics can be exhibited even in a case of an increase in size and thickness.

Hereinbefore, the copper alloy for electronic or electric devices, the copper alloy plate, sheet or strip material for electronic or electric devices, and the component for electronic or electric devices (such as a terminal or a bus bar) according to the embodiment of the present invention have been described, but the present invention is not limited thereto and can be appropriately changed within a range not departing from the technical features of the invention.

For example, in the above-described embodiment, the example of the method of producing the copper alloy for electronic or electric devices has been described, but the method of producing the copper alloy for electronic or electric devices is not limited to the description of the embodiment, and the copper alloy may be produced by appropriately selecting a production method of the related art.

EXAMPLES

Hereinafter, results of a verification test conducted to verify the effects of the present invention will be described.

A copper raw material formed of oxygen-free copper (ASTM B152 C10100) having a purity of 99.99% by mass or greater was prepared, the copper raw material was put into a high-purity graphite crucible, and subjected to high-frequency induction heating in a furnace in which the atmosphere was set to an Ar gas atmosphere so that the material was melted. Each element was added to the obtained molten copper and poured into a carbon mold to produce an ingot having the component composition listed in Table 1. Thereafter, a part of the ingot was cut and machined to obtain an ingot having a thickness of 50 mm, a width of 100 mm, and a length of 100 mm.

Thereafter, the ingot was heated in an electric furnace at 800° C. for 4 hours in an Ar gas atmosphere and subjected to a homogenization treatment.

The ingot after the homogenization heat treatment was hot-forged to obtain a plate or sheet material having a height of approximately 25 mm and a width of approximately 150 mm. The ingot was hot-forged at a temperature of 500° C. or higher, the ingot was reheated in an electric furnace maintained at 800° C. when the surface temperature reached 500° C. or lower, and the ingot was hot-forged again when the surface temperature reached approximately 600° C. The temperature when the hot forging was completed was 500° C. or higher. After the completion of hot forging, a solutionizing heat treatment was performed for 1 minute in an electric furnace heated to 800° C.

Thereafter, the rolling roll was heated to 300° C., and rough rolling was carried out until the thickness listed in Table 1 was obtained.

After the rough rolling, an intermediate heat treatment was performed using an electric furnace and a salt bath furnace under the temperature condition listed in Table 1. The heat treatment using an electric furnace was carried out in an Ar atmosphere. With regard to the specimen subjected to the heat treatment at a temperature of 500° C. to 600° C., the average crystal grain size after the intermediate heat treatment was adjusted to 10 μm or greater and less than 30 μm. Further, with regard to the specimen subjected to the heat treatment at a temperature of 700° C. to 800° C., the average crystal grain size after the intermediate heat treatment was adjusted to 30 μm or greater and less than 50 μm.

Further, the average crystal grain size after the intermediate heat treatment was examined as follows. A surface orthogonal to the rolling width direction, that is, a transverse direction (TD) surface was used as an observation surface and subjected to mirror polishing and etching. Further, the surface was imaged with an optical microscope such that the rolling direction was in the horizontal direction of the photograph, and observation was performed with a field of view at 1000-fold magnification (approximately 300×200 μm$^2$). Thereafter, five line segments having a predetermined length were drawn at predetermined intervals in each of the longitudinal direction and the transverse direction of the photograph according to the cutting method of JIS H 0501. The number of crystal grains that were completely cut was counted, and the average value of the lengths of the cut grains was calculated as the average crystal grain size.

The plate or sheet material on which the intermediate heat treatment had been performed was cut and surface grinding was performed to remove the oxide film. Thereafter, the rolling roll was heated at 200° C., and finish rolling (finish working) was carried out at the rolling rate listed in Table 1; and thereby a thin plate or sheet having the thickness listed in Table 1 was produced.

Next, the thin plate or sheet was subjected to the finish heat treatment after the finish rolling (finish working) under the conditions listed in Table 1 using a hot plate or a salt bath furnace, and thereafter the thin plate or sheet was subjected to water quenching to prepare a thin plate or sheet for characteristic evaluation (strip material for characteristic evaluation).

Next, the following items were evaluated. The evaluation results are listed in Table 2.

(Ratio of Grain Boundary Triple Junctions)

A cross section orthogonal to the rolling width direction, that is, a transverse direction (TD) surface was used as an observation surface, and the crystal grain boundaries (special grain boundaries and random grain boundaries) and the grain boundary triple junctions were measured by an EBSD measuring device and OIM analysis software. Mechanical polishing was performed using waterproof abrasive paper and diamond abrasive grains. Next, finish polishing was performed using a colloidal silica solution. Thereafter, measurement regarding a matrix was performed on a measurement area of 10000 μm$^2$ or greater at every measurement intervals of 0.25 μm at an electron beam acceleration voltage of 20 kV by an EBSD method using an EBSD measuring device (Quanta FEG 450, manufactured by FEI, OIM Data Collection, manufactured by EDAX/TSL (currently AMETEK)) and analysis software (OIM Data Analysis ver. 7.3.1, manufactured by EDAX/TSL (currently AMETEK)). The measured results were analyzed by the data analysis software OIM to obtain CI values at each measurement point. The measurement points in which a CI value was 0.1 or less were removed. The orientation difference between crystal grains was analyzed by the data analysis software OIM. A a boundary having 15° or more of an orientation difference between neighboring measuring points was assigned as a grain boundary. Further, the average grain size A was acquired by Area Fraction. Thereafter, measurement regarding the matrix was performed at every measurement intervals which were 1/10 or less of the average grain size A by the EBSD method. The measured results were analyzed by the data analysis software OIM with a measurement area where the total area of a plurality of visual fields was 10000 μm$^2$ or greater such that a total of 1000 or more crystal grains were included, to obtain a CI value in each measurement point. The measurement points in which a CI value was 0.1 or less were removed. The orientation difference between crystal grains was analyzed by the data analysis software OIM. A boundary having 15° or more of an orientation difference between neighboring measuring points was assigned as a grain boundary. Further, for the three grain boundaries constituting each grain boundary triple junction, the special grain boundary and the random grain boundary were identified by using the CSL sigma value calculated by the neighboring grid point. The coincidence grain boundaries with greater than Σ29 were regarded as random grain boundaries.

(Mechanical Characteristics)

No. 13B test pieces specified in JIS Z 2241 were collected from each strip material for characteristic evaluation and the 0.2% yield strength was measured according to the offset method in JIS Z 2241. Further, the test pieces were collected in a direction parallel to the rolling direction.

(Electrical Conductivity)

Test pieces having a width of 10 mm and a length of 150 mm were collected from each strip material for characteristic evaluation and the electrical resistance was acquired according to a 4 terminal method. Further, the dimension of each test piece was measured using a micrometer and the volume of the test piece was calculated. In addition, the electrical conductivity was calculated from the measured electrical resistance value and volume. Further, the test pieces were collected such that the longitudinal directions thereof were parallel to the rolling direction of each strip material for characteristic evaluation.

(Stress Relaxation Resistance)

A stress relaxation resistance test was carried out by loading a stress according to a method in conformity with a cantilever screw type in Japan Elongated Copper Association Technical Standard JCBA-T309:2004 and the residual stress ratio after holding at a temperature of 150° C. for 1000 hours was measured.

According to the test method, test pieces (width of 10 mm) were collected in a direction parallel to the rolling direction from each strip material for characteristic evaluation, the initial deflection displacement was set to 2 mm such that the maximum surface stress of each test piece was 80% of the yield strength, and the span length was adjusted. The maximum surface stress was determined according to the following equation.

Maximum surface stress (MPa)=1.5 $Et\delta_0/L_s^2$

Each symbol in the equation represents the following item.

E: Young's modulus (MPa)
t: Thickness (mm) of specimen
$\delta_0$: initial deflection displacement (mm)
$L_s$: span length (mm)

The residual stress ratio was measured based on the bending habit after holding at a temperature of 150° C. for 1000 hours and the stress relaxation resistance was evaluated. Further, the residual stress ratio was calculated using the following equation.

$$\text{Residual stress ratio (\%)}=(1-\delta_t/\delta_0)\times 100$$

Each symbol in the equation represents the following item.

$\delta_t$: (permanent deflection displacement (mm) after holding at 150° C. for 1000 hours)–(permanent deflection displacement (mm) after holding at room temperature for 24 hours)
$\delta_0$: initial deflection displacement (mm)

(Bending Workability)

Bending working was performed in conformity with a 4 test method in Japan Copper and Brass Association Technical Standard JCBA-T307:2007.

a plurality of test pieces having a width of 10 mm and a length of 30 mm were collected from the strip material for characteristic evaluation such that the longitudinal direction of each test piece was perpendicular to the rolling direction, and a W bending test was performed by using a W type jig with a bending angle of 90 degrees and a bending radius of 0.05 mm.

Thereafter, the outer peripheral portion of the bent portion was visually confirmed, and a case where cracks were observed was evaluated as "C" (poor), and a case where cracks were not able to be confirmed was evaluated as "B" (good).

(Punching Workability)

The punching workability was evaluated by punching a plurality of circular holes mm) with a metal die from the strip material for characteristic evaluation and measuring the burr height.

The clearance of the metal die was set to approximately 3% with respect to the thickness of the plate or sheet, and punching was performed at a punching speed of 50 spm (stroke per minute). The cut surface on the punched hole side was observed, the burr heights at 10 or more points were measured, and the ratio of the burr height to the thickness of the plate or sheet was acquired.

A case where the ratio of the highest value of the burr height to the thickness of the plate or sheet was 1.0% or less was evaluated as "A" (excellent). A case where the ratio of the highest value of the burr height to the thickness of the plate or sheet was greater than 1.0% and 3.0% or less was evaluated as "B" (good). A case where the ratio of the highest value of the burr height to the thickness of the plate or sheet was greater than 3.0% was evaluated as "C" (poor).

TABLE 1

| | | Composition (mass ratio) | | | | Rough rolling Thickness of plate or sheet (mm) | Intermediate heat treatment Temperature (° C.) | Finish rolling Rolling rate (%) | Finish heat treatment | | |
|---|---|---|---|---|---|---|---|---|---|---|---|
| | | Mg ppm | Ag ppm | P ppm | Cu | | | | Temperature (° C.) | Time (sec) | Thickness (m) |
| Invention Examples | 1 | 120 | 9 | 0.6 | Balance | 1.2 | 700 | 50 | 300 | 15 | 0.6 |
| | 2 | 170 | 6 | 1.0 | Balance | 1.2 | 700 | 50 | 325 | 5 | 0.6 |
| | 3 | 210 | 13 | 1.0 | Balance | 1.2 | 700 | 50 | 350 | 1 | 0.6 |
| | 4 | 360 | 12 | 0.3 | Balance | 1.2 | 750 | 50 | 350 | 1 | 0.6 |
| | 5 | 110 | 6 | 0.4 | Balance | 5 | 750 | 50 | 350 | 1 | 2.5 |
| | 6 | 160 | 12 | 0.5 | Balance | 5 | 600 | 50 | 350 | 1 | 2.5 |
| | 7 | 220 | 14 | 0.3 | Balance | 5 | 625 | 50 | 350 | 1 | 2.5 |
| | 8 | 380 | 10 | 0.6 | Balance | 5 | 600 | 50 | 300 | 15 | 2.5 |
| | 9 | 300 | 8 | 0.4 | Balance | 3 | 625 | 5 | 325 | 5 | 2.5 |
| | 10 | 300 | 8 | 0.4 | Balance | 3 | 700 | 15 | 350 | 1 | 2.5 |
| | 11 | 300 | 8 | 0.4 | Balance | 5 | 750 | 50 | 300 | 10 | 2.5 |
| | 12 | 300 | 8 | 0.4 | Balance | 10 | 700 | 75 | 350 | 1 | 2.5 |
| | 13 | 100 | 5 | 0.0 | Balance | 8 | 750 | 50 | 300 | 10 | 4.0 |
| | 14 | 170 | 7 | 0.7 | Balance | 8 | 700 | 50 | 300 | 15 | 4.0 |
| Invention Examples | 15 | 220 | 11 | 0.0 | Balance | 8 | 600 | 50 | 300 | 10 | 4.0 |
| | 16 | 300 | 14 | 0.4 | Balance | 8 | 600 | 50 | 325 | 5 | 4.0 |
| | 17 | 310 | 8 | 2.9 | Balance | 5 | 700 | 50 | 325 | 3 | 2.5 |
| | 18 | 300 | 9 | 2.4 | Balance | 5 | 600 | 50 | 325 | 3 | 2.5 |
| | 19 | 390 | 19 | 0.6 | Balance | 5 | 750 | 50 | 300 | 10 | 2.5 |
| | 20 | 100 | 5 | 0.8 | Balance | 4 | 700 | 75 | 350 | 1 | 1.0 |
| | 21 | 110 | 5 | 2.8 | Balance | 12 | 700 | 75 | 325 | 5 | 2.5 |
| | 22 | 100 | 5 | 2.6 | Balance | 12 | 700 | 75 | 200 | 10 | 2.5 |
| Comparative Examples | 1 | 30 | 13 | 0.2 | Balance | 12 | 550 | 75 | 200 | 1 | 2.5 |
| | 2 | 120 | 0.5 | 0.1 | Balance | 12 | 600 | 75 | 200 | 1 | 2.5 |
| | 3 | 280 | 9 | 21 | Balance | 12 | 700 | 75 | 300 | 10 | 2.5 |
| | 4 | 320 | 8 | 0.3 | Balance | 3 | 700 | 1 | 325 | 5 | 2.5 |
| | 5 | 1500 | 11 | 0.6 | Balance | 5 | 700 | 50 | 300 | 5 | 2.5 |
| | 6 | 290 | 8 | 0.5 | Balance | 12 | 550 | 95 | 200 | 1 | 0.6 |

TABLE 2

| | | $(NF_{J2}/(1 - NF_{J3}))^{0.5}$ | 0.2% yield strength (MPa) | Electrical conductivity (% IACS) | Residual stress ratio (%) | Bending workability | Punching workability |
|---|---|---|---|---|---|---|---|
| Invention Examples | 1 | 0.27 | 315 | 100% | 72 | B | A |
| | 2 | 0.27 | 347 | 99% | 78 | B | A |
| | 3 | 0.26 | 354 | 99% | 78 | B | A |
| | 4 | 0.27 | 359 | 98% | 80 | B | A |
| | 5 | 0.27 | 338 | 98% | 71 | B | A |
| | 6 | 0.27 | 355 | 99% | 75 | B | A |
| | 7 | 0.27 | 362 | 98% | 78 | B | A |
| | 8 | 0.26 | 369 | 96% | 79 | B | A |
| | 9 | 0.41 | 257 | 99% | 82 | B | B |
| | 10 | 0.29 | 256 | 98% | 85 | B | A |
| | 11 | 0.27 | 348 | 98% | 81 | B | A |
| | 12 | 0.24 | 391 | 97% | 79 | B | A |
| | 13 | 0.28 | 343 | 99% | 70 | B | A |
| | 14 | 0.27 | 346 | 99% | 78 | B | A |
| | 15 | 0.26 | 347 | 98% | 78 | B | A |
| | 16 | 0.27 | 347 | 97% | 80 | B | A |
| | 17 | 0.27 | 344 | 98% | 77 | B | A |
| | 18 | 0.27 | 345 | 97% | 79 | B | A |
| | 19 | 0.27 | 344 | 98% | 85 | B | A |
| | 20 | 0.24 | 372 | 99% | 69 | B | A |
| | 21 | 0.24 | 369 | 99% | 67 | B | A |
| | 22 | 0.23 | 367 | 99% | 55 | B | A |

TABLE 2-continued

|  |  | $(NF_{J2}/(1-NF_{J3}))^{0.5}$ | 0.2% yield strength (MPa) | Electrical conductivity (% IACS) | Residual stress ratio (%) | Bending workability | Punching workability |
|---|---|---|---|---|---|---|---|
| Comparative Examples | 1 | — | 401 | 100% | 25 | — | — |
|  | 2 | — | 405 | 99% | 33 | — | — |
|  | 3 | 0.24 | 403 | 98% | — | C | — |
|  | 4 | 0.51 | 217 | 99% | — | — | C |
|  | 5 | — | — | 88% | — | — | — |
|  | 6 | 0.20 | 476 | 96% | — | — | — |

In Comparative Example 1, since the amount of Mg was less than the range of the present embodiment, the stress relaxation resistance was low. Therefore, the bending workability and the punching properties were not evaluated.

In Comparative Example 2, since the amount of Ag was less than the range of the present embodiment, the stress relaxation resistance was low. Therefore, the bending workability and the punching properties were not evaluated.

In Comparative Example 3, since the amount of P was greater than the range of the present embodiment, the bending workability was evaluated as "C" (poor). Therefore, the stress relaxation resistance and the punching properties were not evaluated.

In Comparative Example 4, $(NF_{J2}/(1-NF_{J3}))^{0.5}$ was greater than the range of the present embodiment, the network length of the random grain boundary was shortened, and thus the punching workability was degraded. Therefore, the stress relaxation resistance and the bending workability were not evaluated.

In Comparative Example 5, since the amount of Mg was greater than the range of the present embodiment, the electrical conductivity was decreased. Therefore, the stress relaxation resistance, the bending workability, and the punching properties were not evaluated.

In Comparative Example 6, $(NF_{J2}/(1-NF_{J3}))^{0.5}$ was 0.20, which was less than the range of the present embodiment, and the 0.2% yield strength was higher than necessary. Therefore, the stress relaxation resistance, the bending workability, and the punching properties were not evaluated.

On the contrary, in Invention Examples, it was confirmed that the 0.2% yield strength, the electrical conductivity, the stress relaxation resistance, the bending workability, and the punching workability were excellent.

As described above, according to Invention Examples, it was confirmed that a copper alloy for electronic or electric devices and a copper alloy plate, sheet or strip material for electronic or electric devices with excellent electrical conductivity, strength, stress relaxation resistance, bending workability, and punching workability can be provided.

INDUSTRIAL APPLICABILITY

The copper alloy for electronic or electric devices and the copper alloy plate, sheet or strip material for electronic or electric devices of the present embodiment can be suitably applied to a component for electronic or electric devices such as a terminal such as a connector or a press fit, or a bus bar.

What is claimed is:

1. A copper alloy for electronic or electric devices, comprising:
   100 mass ppm or greater and 400 mass ppm or less of Mg;
   5 mass ppm or greater and 20 mass ppm or less of Ag;
   less than 5 mass ppm of P; and
   a balance being Cu and inevitable impurities,
   wherein a surface orthogonal to a rolling width direction is used as an observation surface, measurement regarding a matrix is performed on a measurement area of 10000 μm² or greater at every measurement intervals of 0.25 μm by an EBSD method, measured results are analyzed by data analysis software OIM to obtain a CI value in each measurement point, a measurement point in which a CI value is 0.1 or less is removed, an orientation difference between crystal grains is analyzed, a boundary having 15° or more of an orientation difference between neighboring measuring points is assigned as a grain boundary, an average grain size A is acquired according to Area Fraction, measurement regarding the matrix is performed at every measurement intervals which are 1/10 or less of the average grain size A by the EBSD method, measured results are analyzed by the data analysis software OIM with a measurement area of 10000 μm² or greater in a plurality of visual fields such that a total of 1000 or more crystal grains are included to obtain a CI value in each measurement point, a measurement point in which a CI value is 0.1 or less is removed, an orientation difference between crystal grains is analyzed, and a boundary having 15° or more of an orientation difference between neighboring measuring points is assigned as a grain boundary, a coincidence boundary with Σ29 or less is defined as a special grain boundary, and the other grain boundaries are defined as random grain boundaries, in grain boundary triple junctions analyzed by the OIM, when a ratio of J3, in which all three grain boundaries constituting a grain boundary triple junction are special grain boundaries, to all grain boundary triple junctions is defined as $NF_{J3}$ and a ratio of J2, in which two grain boundaries constituting a grain boundary triple junction are special grain boundaries and one grain boundary constituting the grain boundary triple junction is a random grain boundary, to all grain boundary triple junctions is defined as $NF_{J2}$,
   an expression of $0.22 < (NF_{J2}/(1-NF_{J3}))^{0.5} \leq 0.45$ is satisfied.

2. The copper alloy for electronic or electric devices according to claim 1,
   wherein an electrical conductivity is 90% IACS or greater.

3. The copper alloy for electronic or electric devices according to claim 1,
   wherein a 0.2% yield strength measured by a tensile test performed in a direction parallel to a rolling direction is 150 MPa or greater and 450 MPa or less.

4. The copper alloy for electronic or electric devices according to claim 1,
   wherein a residual stress ratio is 50% or greater under conditions of 150° C. for 1000 hours.

5. A copper alloy plate, sheet or strip material for electronic or electric devices comprising:
the copper alloy for electronic or electric devices according to claim 1,
wherein a thickness is greater than 0.5 mm.

6. The copper alloy plate, sheet or strip material for electronic or electric devices according to claim 5,
wherein the copper alloy plate, sheet or strip material includes an Sn plating layer or an Ag plating layer on a surface thereof.

7. A component for electronic or electric devices comprising:
the copper alloy plate, sheet or strip material for electronic or electric devices according to claim 5.

8. A terminal comprising:
the copper alloy plate, sheet or strip material for electronic or electric devices according to claim 5.

9. A bus bar comprising:
the copper alloy plate, sheet or strip material for electronic or electric devices according to claim 5.

* * * * *